United States Patent
Muto

(10) Patent No.: US 10,191,502 B2
(45) Date of Patent: Jan. 29, 2019

(54) POWER SUPPLY DEVICE

(71) Applicant: Hosiden Corporation, Osaka (JP)

(72) Inventor: Takashi Muto, Osaka (JP)

(73) Assignee: Hosiden Corporation, Osaka (JP)

( * ) Notice: Subject to any disclaimer, the term of this patent is extended or adjusted under 35 U.S.C. 154(b) by 0 days.

(21) Appl. No.: 15/708,321

(22) Filed: Sep. 19, 2017

(65) Prior Publication Data

US 2018/0088613 A1 Mar. 29, 2018

(30) Foreign Application Priority Data

Sep. 27, 2016 (JP) .................. 2016-188502

(51) Int. Cl.
*G05F 1/46* (2006.01)

(52) U.S. Cl.
CPC .................... *G05F 1/468* (2013.01)

(58) Field of Classification Search
CPC ....................................... G05F 1/468
See application file for complete search history.

(56) References Cited

U.S. PATENT DOCUMENTS

| | | | | | |
|---|---|---|---|---|---|
| 8,232,785 | B2* | 7/2012 | Sun | .................. | G05F 1/575 323/281 |
| 8,686,701 | B2* | 4/2014 | Ting | ................ | H02M 3/156 323/282 |
| 2004/0108843 | A1* | 6/2004 | Lanni | .................. | G05F 1/56 323/271 |
| 2010/0157627 | A1* | 6/2010 | Wang | .............. | G01R 19/0084 363/15 |
| 2015/0029762 | A1* | 1/2015 | Lu | ................ | H02M 3/33523 363/21.17 |

FOREIGN PATENT DOCUMENTS

JP        H07-104870 A     4/1995

\* cited by examiner

*Primary Examiner* — Jue Zhang

(74) *Attorney, Agent, or Firm* — Dilworth & Barrese, LLP

(57) ABSTRACT

A power supply device for outputting a DC voltage includes: a pair of positive and negative output terminals, a load to which the DC voltage is applied being connected thereto; a detection unit configured to detect a voltage value of the DC voltage output from the output terminals; a setting unit configured to select an instruction value for the DC voltage output from the output terminals from among a plurality of preset instruction values, and set the selected instruction value; and a correction unit configured to increase one of the voltage value detected by the detection unit and the instruction value set by the setting unit, according to an amount by which a current value of a current that flows through the load increases.

1 Claim, 2 Drawing Sheets

POWER SUPPLY DEVICE

CROSS-REFERENCE TO RELATED APPLICATIONS

This application is based on and claims priority under 35 U.S.C. Section 119 to Japanese Patent Application No. 2016-188502 filed on Sep. 27, 2016, the entire content of which is incorporated herein by reference.

TECHNICAL FIELD

This disclosure relates to a power supply device for outputting a DC voltage.

RELATED ART

Conventionally, power supply devices (so-called DC/DC converters) for converting a DC voltage of a predetermined voltage value to a DC voltage of an intended voltage value have been used. This kind of power supply device is configured to keep the voltage value of an output voltage (hereinafter, simply "output voltage") fixed. Meanwhile, a load to which a DC voltage from a power supply device is applied is connected thereto using a cable. Since this cable has a predetermined impedance, the voltage value of the voltage that is applied to the load (hereinafter, "applied voltage") decreases as the current consumption of the load increases. A technique for compensating such a decrease in the applied voltage has been examined (e.g. JP H7-104870A).

A stabilization circuit in a DC power supply device described in JP H7-104870A is configured to include an output voltage correction circuit, which has load current-output voltage characteristics in which the output voltage of a power supply device is increased (or reduced) in response to an increase (or decrease) in the load current so that the voltage applied to a load is substantially fixed.

SUMMARY

For example, the output voltage of a power supply device may be changed depending on the intended purpose. However, application of the technique described in JP H7-104870A to a power supply device whose output voltage is changeable has not been examined. For example, if a voltage division ratio of voltage dividing resistors provided in a voltage detection resistor unit is changed to change the output voltage in the technique described in JP H7-104870A, the correction value for the output voltage is also changed in accordance with the voltage division ratio of the voltage dividing resistors, and accordingly, the voltage that is applied to a load device may decrease.

Embodiments of the present invention provide a power supply device in which a decrease in the voltage that is applied to a load (which corresponds to the aforementioned "load device") can be suppressed even if the output voltage has been changed.

A power supply device described in this disclosure is a power supply device for outputting a DC voltage, including: a pair of positive and negative output terminals, a load to which the DC voltage is applied being connected thereto; a detection unit configured to detect a voltage value of the DC voltage output from the output terminals; a setting unit configured to select an instruction value for the DC voltage output from the output terminals from among a plurality of preset instruction values, and set the selected instruction value; and a correction unit configured to increase one of the voltage value detected by the detection unit and the instruction value set by the setting unit, according to an amount by which a current value of a current that flows through the load increases.

In this case, one of the voltage value detected by the detection unit and the instruction value set by the setting unit is increased in accordance with the value of the load current (current value of the load current). Accordingly, the output (output voltage) can be compensated to keep the voltage that is applied to the load at an intended voltage value. In addition, this compensation can be set so as to depend only on the load current (current value of the load current). Accordingly, even if, for example, the instruction value for the DC voltage output from the power supply device has been changed, a compensation value for compensating the output (output voltage) of the power supply device, the compensation value corresponding to the load current, can be set unchanged, making it possible to suppress a decrease in the voltage that is applied to the load.

One embodiment of the power supply device may employ a configuration in which the detection unit is provided between the positive terminal of the pair of output terminals and a ground potential, and the correction unit is provided between the setting unit and the ground potential, and increases the instruction value.

In this case, the instruction value set by the setting unit can be increased according to an increase in the load current. Accordingly, the output (output voltage) from the power supply device can be increased in accordance with the value of the load current, making it possible to suppress a decrease in the voltage that is applied to the load.

One embodiment of the power supply device may employ a configuration in which the detection unit has at least two resistors that are connected in series to each other and divide the DC voltage with respect to the ground potential, the correction unit has a resistor provided between the negative terminal of the pair of output terminals and the ground potential, and the setting unit has at least two resistors that are connected in series to each other and divide a reference voltage, which is a preset constant voltage, with respect to a potential of the negative terminal, and one of the at least two resistors to which the reference voltage is applied is connected in parallel to another resistor that is different from the at least two resistors, according to the plurality of instruction values.

In this case, a compensation value for the output (output voltage) of the power supply device, the compensation value corresponding to the load current, can be set through a resistance value of the resistor provided in the correction unit. Accordingly, the output can be compensated with a simple configuration.

DESCRIPTION OF EMBODIMENTS

The power supply device according to this disclosure has a function of compensating a voltage drop that occurs due to impedance of a cable that connects the power supply device to a load. A power supply device 1 according to this embodiment will be described below.

Figure 1:
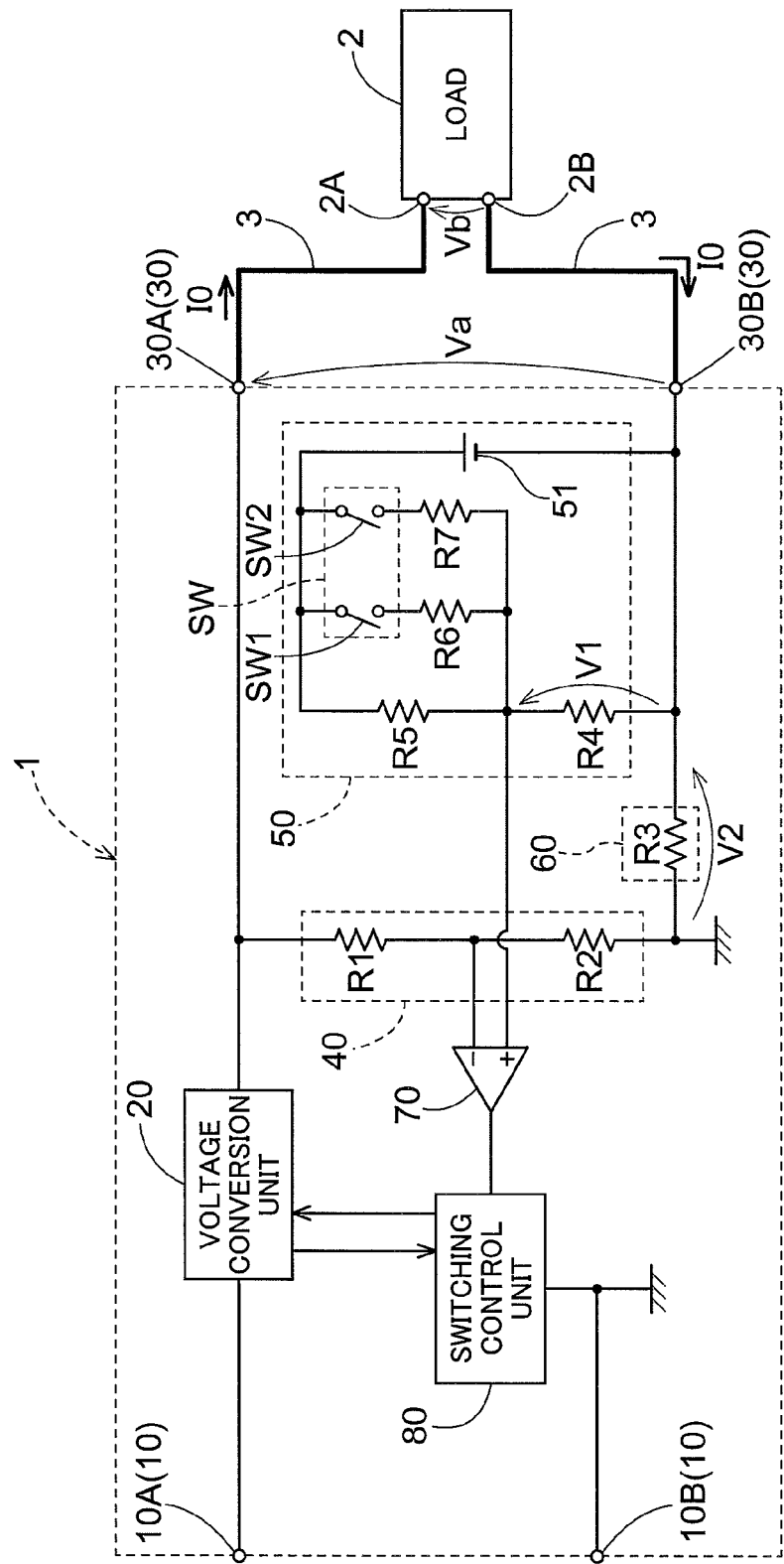
FIG. 1 schematically shows a configuration of a power supply device.

The power supply device 1 is configured to output a DC voltage. Particularly, this embodiment will be described while taking, as an example, a DC/DC converter for converting a DC voltage to a DC voltage of an intended voltage value and outputting the resulting DC voltage. FIG. 1 schematically shows a configuration of the power supply device 1 according to this embodiment. As shown in FIG. 1, the power supply device 1 includes a pair of input terminals 10, a voltage conversion unit 20, a pair of output terminals 30, a detection unit 40, a setting unit 50, a correction unit 60, an error amplifier 70, and a switching control unit 80.

An input voltage of a predetermined voltage value is applied to the power supply device 1 through the pair of input terminals 10. In the description of this embodiment, the power supply device 1 is a DC/DC converter, and accordingly the input voltage is a DC voltage. For this reason, the pair of input terminals 10 is constituted by a positive terminal 10A and a negative terminal 10B. The negative terminal 10B is grounded. For this reason, a voltage having a potential difference is applied as the input voltage, with a ground potential serving as a reference. The DC voltage applied to the pair of input terminals 10 can be supplied from an AC/DC converter that converts an AC voltage to a DC voltage, for example.

Although not shown in the diagram, the voltage conversion unit 20 is configured to include an inductor, a switching element, a diode, and a capacitor. The voltage conversion unit 20 accumulates energy in the inductor in accordance with switching of the switching element, and converts the input voltage to a DC voltage of a predetermined voltage value based on this energy. For example, this voltage conversion unit 20 may employ circuitry of a known flyback type, or circuitry of a chopper type.

The pair of output terminals 30 is a pair of positive and negative terminals, and a load 2, to which a DC voltage is supplied, is connected thereto. The pair of positive and negative output terminals 30 includes a positive terminal 30A and a negative terminal 30B. The DC voltage of the predetermined voltage value obtained through the conversion by the voltage conversion unit 20 is applied to the positive terminal 30A, which is connected to a positive terminal 2A of the load 2 via a cable 3. The negative terminal 30B is connected to a negative terminal 2B of the load 2 via a cable 3.

The detection unit 40 detects a voltage value of a DC voltage output from the output terminal 30. In this embodiment, the detection unit 40 is provided between the positive terminal 30A of the pair of output terminals 30 and a ground potential. Accordingly, the voltage value of the DC voltage output from the output terminals 30 is detected as a potential difference with the ground potential serving as a reference. As shown in FIG. 1, the detection unit 40 has at least two resistors R1 and R2, which are connected in series to each other and divide a DC voltage output from the output terminal 30 with respect to the ground potential. Accordingly, the DC voltage output from the output terminal 30 can be detected based on resistance values of the resistors R1 and R2, and a voltage value that results from the voltage division by the resistors R1 and R2. The voltage that results from the voltage division by the resistors R1 and R2 is input to an inverting terminal of the later-described error amplifier 70.

The setting unit 50 sets an instruction value for the DC voltage output from the output terminal 30 by selecting the instruction value from among a plurality of preset instruction values. The instruction value for the DC voltage output from the output terminal 30 corresponds to a voltage value of an output voltage for which a request is made to the power supply device 1. In this embodiment, the power supply device 1 is configured to be able to output an output voltage of a voltage value that is selected from among a plurality of voltage values. The selection from among the plurality of voltage values is performed by controlling an open/close state of later-described switches SW provided in the setting unit 50, based on an output voltage request instruction (not shown) that is made to the power supply device 1.

In this embodiment, the setting unit 50 has a reference supply 51, at least two resistors R4 and R5, and other resistors R6 and R7 that are different from the at least two resistors R4 and R5. The reference supply 51 is provided, with a negative terminal thereof connected to the negative terminal 30B of the power supply device 1, and outputs a reference voltage Vref, which is a constant voltage that is preset with the potential at the negative terminal 30B serving as a reference potential. The preset constant voltage is a fixed DC voltage. Here, the reference voltage Vref contributes to accuracy of the output voltage of the power supply device 1. Accordingly, it is favorable that the reference voltage Vref is a fixed DC voltage with a small error.

The two resistors R4 and R5 are connected in series to each other, and divide the reference voltage Vref with respect to the voltage at the negative terminal 30B. Accordingly, assuming that the potential across terminals of the resistor R4 is V1, V1 is expressed by Equation (1) below.

$$V1 = \frac{Vref}{R4 + R5} \times R4 \qquad (1)$$

The resistors R6 and R7 are connected in parallel to the resistor R5 to which the reference voltage Vref is applied, of the two resistors R4 and R5, in accordance with the plurality of instruction values. As shown in FIG. 1, the resistor R6 is connected in parallel to the resistor R5 via a switch SW1, which is one of the switches SW and is connected in series to the resistor R6. The resistor R7 is connected in parallel to the resistor R5 via a switch SW2, which is one of the switches SW and is connected in series to the resistor SW7. Thus, the aforementioned voltage V1 across the terminals of the resistor R4 can be changed (increased) by turning off one of or both the switch SW1 and the switch SW2.

A midpoint between the resistor R4 and the resistor R5 is connected to a non-inverting terminal of the later-described error amplifier 70. Thus, a voltage at the midpoint between the resistor R4 and the resistor R5 is output as a voltage instruction that corresponds to the instruction value, from the setting unit 50.

The correction unit 60 increases the instruction value set by the setting unit 50, according to the amount by which the current value of a current that flows through the load 2 increases. The current that flows through the load 2 corresponds to a current I0 that flows from the positive terminal 30A into the positive terminal 2A of the load 2 via the cable 3, or a current I0 that flows from the negative terminal 2B of the load 2 into the negative terminal 30B via the cable 3. Note that loss in the load 2 is ignored. As this current I0 increases, the correction unit 60 increases the potential at the midpoint (connecting point) between the resistor R4 and the resistor R5 in order to increase the instruction value from the setting unit 50.

In this embodiment, the correction unit 60 is provided between the setting unit 50 and the ground potential. More specifically, the correction unit 60 is configured to have a resistor R3 that is provided between the negative terminal 30B of the pair of output terminals 30 and a ground potential. Accordingly, the aforementioned current that flows through the load 2 flows into the ground potential via the resistor R3. Assuming that the potential across terminals of the resistor R3 is V2, V2 is expressed by Equation (2) below. Here, it is assumed that input impedance of the error amplifier 70 is infinite, and the switch SW1 and the switch SW2 are open.

$$V2 = \left(I0 + \frac{Vref}{R4+R5}\right) \times R3 \qquad (2)$$

Based on Equation (2), the potential V2 across the terminals of the resistor R3 increases in proportion to the current I0. On the other hand, as mentioned above, the voltage instruction output from the setting unit 50 to the error amplifier 70 is the voltage at the midpoint between the resistor R4 and the resistor R5. This voltage is the sum of the potential V1 across the terminals of the resistor R4 and the potential V2 across the terminals of the resistor R3, when the ground potential is a reference. Accordingly, as mentioned above, the correction unit 60 can increase the voltage instruction from the setting unit 50 as the current I0 increases.

The error amplifier 70 controls switching of the switching element provided in the voltage conversion unit 20 so that the detection result from the detection unit 40 coincides with the voltage instruction from the setting unit 50. Accordingly, as mentioned above, the potential at the midpoint between the resistor R1 and the resistor R2 is input to the inverting terminal of the error amplifier 70, and the potential at the midpoint between the resistor R4 and the resistor R5 is input to the non-inverting terminal of the error amplifier 70. The output of the error amplifier 70 is transferred to the later-described switching control unit 80.

The switching control unit 80 controls switching of the switching element provided in the voltage conversion unit 20 based on the output of the error amplifier 70. Specifically, the switching control unit 80 sets a duty ratio for controlling the switching element based on the output of the error amplifier 70, and performs PWM control on the switching element. Thus, the potential at the positive terminal 30A can be increased in accordance with the value of the current that flows through the load 2.

A potential difference (output voltage Va) between the positive terminal 30A and the negative terminal 30B, which are the pair of output terminals 30, of the power supply device 1 that is configured as above is expressed by Equation (3). Here, it is assumed that the switch SW1 and the switch SW2 are open.

$$Va = \frac{V1+V2}{R2} \times (R1+R2) \qquad (3)$$

$$= \left\{\left(\frac{Vref}{R4+R5} \times R4\right) + \left(\frac{Vref}{R4+R5}\right) \times R3 + I0 \times R3\right\} \times \frac{R1+R2}{R2}$$

$$= \left\{\left(\frac{Vref}{R4+R5}\right) \times (R3+R4) + I0 \times R3\right\} \times \frac{R1+R2}{R2}$$

-continued $$= \left\{\left(\frac{Vref}{R4+R5}\right) \times \frac{(R1+R2) \times (R3+R4)}{R2}\right\} + \frac{(R1+R2) \times R3}{R2} \times I0$$

If only the switch SW1 is closed, a state where the resistor R5 and the resistor R6 are connected in parallel to each other is entered. Accordingly, the potential difference (output voltage Va) is expressed by Equation (4).

$$Va = \qquad (4)$$

$$\left\{\left(\frac{Vref}{R4 + \frac{R5 \times R6}{R5+R6}}\right) \times \frac{(R1+R2) \times (R3+R4)}{R2}\right\} + \frac{(R1+R2) \times R3}{R2} \times I0$$

Furthermore, if only the switch SW2 is closed, a state where the resistor R5 and the resistor R7 are connect in parallel to each other is entered. Accordingly, the voltage difference (output voltage Va) is expressed by Equation (5).

$$Va = \qquad (5)$$

$$\left\{\left(\frac{Vref}{R4 + \frac{R5 \times R7}{R5+R7}}\right) \times \frac{(R1+R2) \times (R3+R4)}{R2}\right\} + \frac{(R1+R2) \times R3}{R2} \times I0$$

As indicated by Equation (3) to Equation (5) above, the current I0 that flows through the load 2 is an independent term. Accordingly, the compensation value for a voltage drop due to the cables 3 can be set in accordance with the value of the current I0 regardless of the instruction value for the DC voltage for which a request is made to the power supply device 1 by the setting unit 50.

Figure 2:
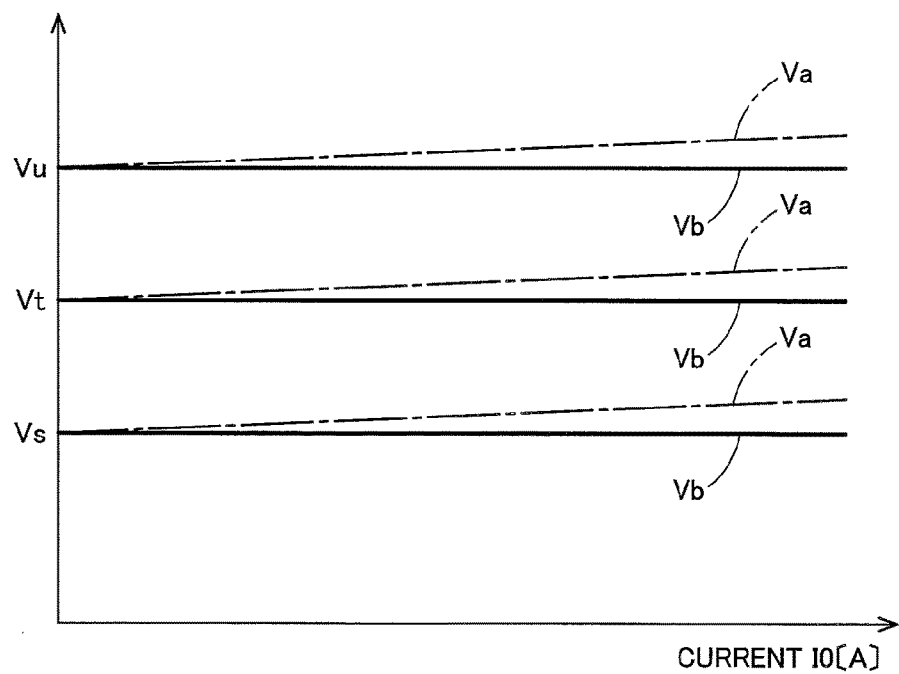
FIG. 2 shows a relationship between an output voltage of the power supply device and a load current, and between a voltage that is applied to a load and the load current.

FIG. 2 shows a relationship between the output voltage Va output from the power supply device 1 and the current I0 that flows through the load 2, and a relationship between an applied voltage Vb that is applied to the load 2 and the current I0 that flows through the load 2. Note that the applied voltage Vb refers to a potential difference between the positive terminal 2A and the negative terminal 2B of the load 2. In the example in FIG. 2, Vs denotes the output voltage in the case of setting the switch SW1 and the switch SW2 in an open state. Vt denotes the output voltage in the case of setting only the switch SW2 in an open state. Vu denotes the output voltage in the case of setting only the switch SW1 in an open state. As shown in FIG. 2, whichever of Vs, Vt, and Vu the output voltage Va is, the output voltage Va of the power supply device 1 increases as the load current increases, and the applied voltage Vb that is applied to the load 2 is fixed regardless of the current that flows through the load 2.

Also, as shown in FIG. 2, whichever of Vs, Vt, and Vu the output voltage Va of the power supply device 1 is, the difference between the applied voltage Vb and the output voltage Va takes the same value if the current I0 that flows through the load 2 is the same. Accordingly, with this power supply device 1, a voltage drop due to the cables 3 can be compensated without depending on the instruction value for the DC voltage for which a request is made to the power supply device 1.

Other Embodiments

In the description of the above embodiment, the correction unit 60 increases the instruction value set by the setting unit 50, according to the amount by which the current value of a current that flows through the load 2 increases. However, the correction unit 60 can also be configured to increase the voltage value detected by the detection unit 40. Specifically, the correction unit 60 may be configured so that the resistance value between the positive terminal 30A and the inverting terminal of the error amplifier 70 increases according to the amount by which the current that flows through the load 2 increases.

Otherwise, the correction unit 60 may also be configured so that the resistance value between the positive terminal of the reference supply 51 and the non-inverting terminal of the error amplifier 70 decreases according to the amount by which the current that flows through the load 2 increases, or may be configured so that the resistance value between the inverting terminal of the error amplifier 70 and the ground potential decreases according to the amount by which the current that flows through the load 2 increases.

Although the above embodiment has been described while taking, as an example, the circuitry in FIG. 1, the invention may also be employed in circuitry other than that shown in FIG. 1.

This disclosure is applicable to power supply devices for outputting a DC voltage.

The invention claimed is:

1. A power supply device for outputting a DC voltage comprising:
   a pair of positive and negative output terminals, a load to which the DC voltage is applied being connected thereto;
   a detection unit configured to detect a voltage value of the DC voltage output from the output terminals;
   a setting unit configured to select an instruction value for the DC voltage output from the output terminals from among a plurality of preset instruction values, and set the selected instruction value; and
   a correction unit configured to increase one of the voltage value detected by the detection unit and the instruction value set by the setting unit, according to an amount by which a current value of a current that flows through the load increases, wherein
   the detection unit is provided between the positive terminal of the pair of output terminals and a ground potential,
   the correction unit is provided between the setting unit and the ground potential, and increases the instruction value,
   the detection unit has at least two resistors that are connected in series to each other and divide the DC voltage with respect to the ground potential,
   the correction unit has a resistor provided between the negative terminal of the pair of output terminals and the ground potential, and
   the setting unit has at least two resistors that are connected in series to each other and divide a reference voltage, which is a preset constant voltage, with respect to a potential of the negative terminal, and one of the at least two resistors to which the reference voltage is applied is connected in parallel to another resistor that is different from the at least two resistors, according to the plurality of instruction values.

* * * * *